United States Patent
Jaiswal et al.

(10) Patent No.: US 8,130,915 B2
(45) Date of Patent: Mar. 6, 2012

(54) VERIFICATION OF USER PRESENCE DURING AN INTERACTIVE VOICE RESPONSE SYSTEM SESSION

(75) Inventors: Peeyush Jaiswal, Boca Raton, FL (US); Sheri G. Daye, Boca Raton, FL (US); Fang Wang, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 12/547,885

(22) Filed: Aug. 26, 2009

(65) Prior Publication Data

US 2011/0051907 A1    Mar. 3, 2011

(51) Int. Cl.
*H04M 1/64* (2006.01)
*H04M 3/00* (2006.01)

(52) U.S. Cl. .................................. 379/88.02; 704/273
(58) Field of Classification Search .............. 379/67.1, 379/80, 83, 88.01–88.22, 201, 211, 93.12, 379/144–145; 704/246–252, 273; 381/386
See application file for complete search history.

(56) References Cited

U.S. PATENT DOCUMENTS

| | | | |
|---|---|---|---|
| 6,356,868 B1 * | 3/2002 | Yuschik et al. | 704/246 |
| 6,421,645 B1 | 7/2002 | Beigi et al. | |
| 7,295,970 B1 | 11/2007 | Gorin et al. | |
| 7,716,055 B1 * | 5/2010 | McIntosh et al. | 704/273 |
| 7,801,288 B2 * | 9/2010 | Wasserblat et al. | 379/114.14 |
| 2002/0152078 A1 * | 10/2002 | Yuschik et al. | 704/273 |
| 2006/0287863 A1 | 12/2006 | Santos et al. | |

FOREIGN PATENT DOCUMENTS

JP      2004-271561      9/2004

* cited by examiner

*Primary Examiner* — Davetta W Goins
*Assistant Examiner* — Mohammad Islam

(57) ABSTRACT

In those transactions requiring the approval of two or more users, users can perform verification of identity and then completion of desired transaction using an IVR system. The combination of two or more user voice prints previously collected during an enrollment phase can be used for verification of parties to the transaction. During a subsequent verification phase of the IVR system, the users can speak their own password phase when prompted to do so during a defined period of time and the IVR system captures them in a captured mixed voice print. Verification can then be provided by comparing the captured mixed voice print with a joined voice reference model built from stored voice reference models.

17 Claims, 2 Drawing Sheets

VERIFICATION OF USER PRESENCE DURING AN INTERACTIVE VOICE RESPONSE SYSTEM SESSION

BACKGROUND

With the advance of speaker verification technology, some transactions can be automated through interactive voice response (IVR) systems rather than in person. Currently, transactions through IVR systems can accommodate a single user having a single IVR profile for which approval of only the one user is required, or, in the case of a transaction for an account having two or more users, the transaction will only proceed if the approval of only one user is required. For transactions on accounts requiring approval of two or more users, both users must be present in person to verify the desired transaction, and thus an IVR system may not be used.

Consider the example of two users, such as a husband and a wife, who have a shared joint bank account. If only one of them is needed to authorize a transaction, either one of their voice print will be sufficient to authorize the transaction using an IVR system. This, however, may not provide enough security where the desired transaction is of a sensitive nature, such as if the desired transaction amount is significant. If, however, both need to approve the transaction, such as for a more sensitive transaction, both must be present to complete the transaction and an IVR system may not be used for authentication, verification and completion of the transaction. Moreover, the requirement that both parties need to be present to complete the transaction is not convenient for users, particularly where they may be far apart physically.

BRIEF SUMMARY

In accordance with embodiments consistent with the present invention, a method and system provides verification of user presence during an interactive voice response (IVR) system session. During an enrollment phase of an interactive voice response (IVR) system first and second users provides first and second voice prints, respectively, to the IVR system. The first user and a second user are authorized users of a joint account of the IVR system. The first and second voice prints are captured and first and second first voice reference models, respectively, are created. These first and second voice reference models are stored. In response to the multiple users requesting to conduct a transaction of the joint account that requires presence of both the first and second users during the transaction to complete the transaction, in a verification phase of the IVR system: the IVR system requests that the first and second users speak their passwords during a defined period of time; the IVR system determines which of the first and second users spoke first at a first time stamp during the mixed voice print and when the other user of the first and second users spoke second at a second time stamp during the mixed voice print; the IVR system creating a joined voice reference model of the first and second users from the first and second voice reference models, with the joined voice reference model having at a first time stamp the voice reference model of the user determined to have spoken first and at a second time stamp the user determined to have spoken second, wherein the first and second time stamps of the joined voice reference model correspond in time of the joined voice reference model to the first and second time stamps of the mixed voice print. The IVR system compares the mixed voice print to the joined voice reference model. When the mixed voice print matches the joined voice reference model, the IVR system verifies presence of the first and second users and permits the transaction to proceed.

BRIEF DESCRIPTION OF THE SEVERAL VIEWS OF THE DRAWINGS

The features of the invention believed to be novel are set forth with particularity in the appended claims. The invention itself however, both as to organization and method of operation may be best understood by reference to the following detailed description of the invention, which describes certain exemplary embodiments of the invention, taken in conjunction with the accompanying drawings in which:

DETAILED DESCRIPTION

Consistent with various embodiments presented herein, an improved system and method for verification of user presence during an IVR system session are provided. In those transactions requiring the approval of two or more users, such as secured, sensitive banking transactions, the embodiments presented herein allow such users to still perform verification of identity and then completion of a desired transaction using an IVR system. The combination of two or more user voice prints previously collected during an enrollment phase can be used for verification of parties to the transaction. During a subsequent verification phase of the IVR system, the users can speak their own password phase when prompted to do so during a defined period of time and the IVR system captures them in a captured mixed voice print. Verification can then be provided by comparing the captured mixed voice print with a joined voice reference model built from stored voice reference models. If there is a sufficient match, then the presence of the two or more users in the transaction is verified and the transaction may proceed via the IVR system. This allows transactions requiring the presence of two or more parties, such as extremely sensitive transaction, to be performed in the IVR system and it also ensures that the parties are aware of the transaction since they needed to be present via IVR to provide speech samples to authenticate the transaction. Even if the parties are far apart, physically, this can still be achieved by conference calls, for example, with the IVR system.

Figure 1:
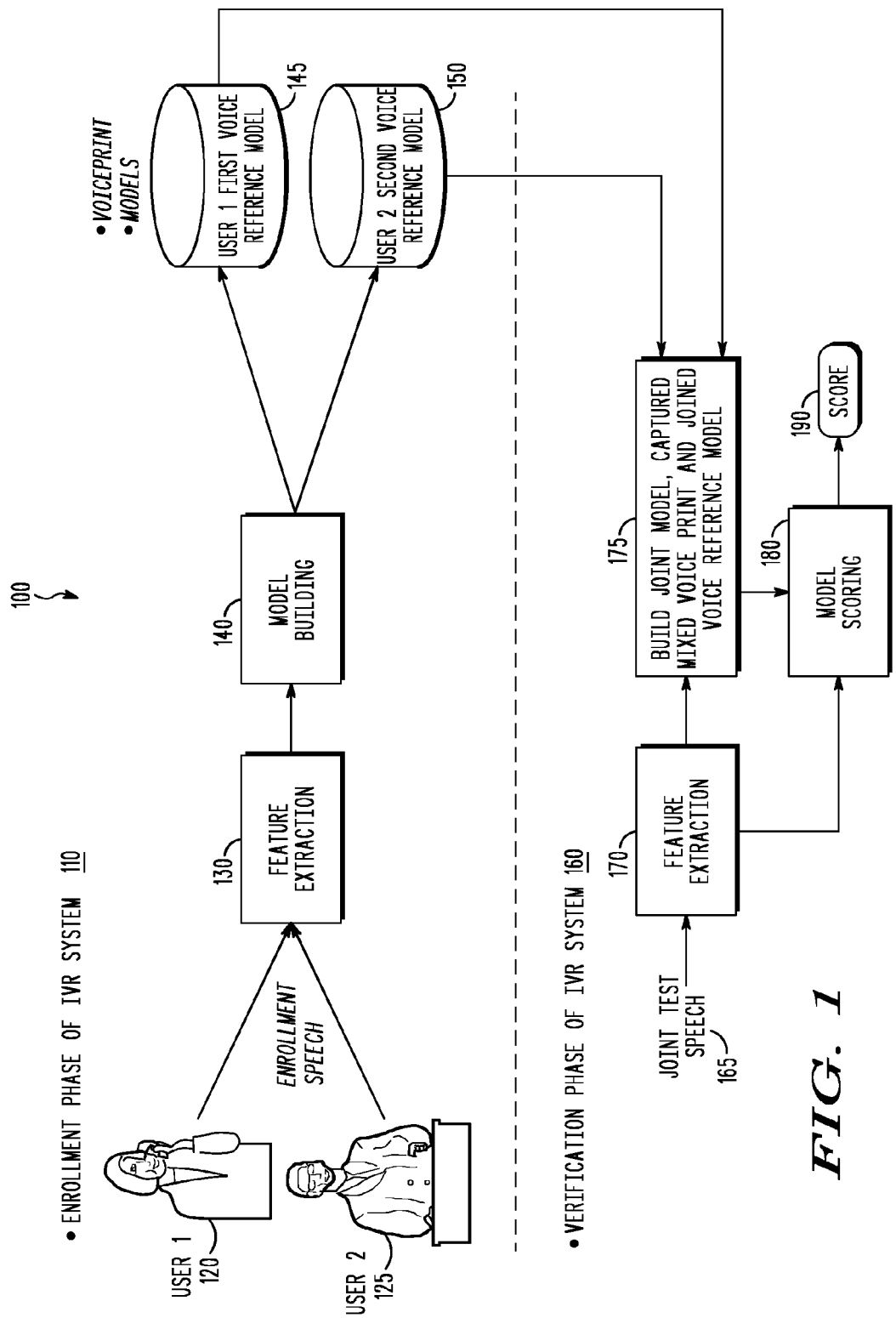
FIG. 1 is a system diagram that illustrates the enrollment and verification phases of an interactive voice response (IVR) system, in accordance with certain embodiments.

Therefore, in accordance with various embodiments, an IVR system 100, having an enrollment phase 110 and a verification phase 160 is presented in FIG. 1. In this system, two users are shown, user1 120 and user2 125. In the enrollment phase, the IVR system records all parties' voice prints for a joint profile. These can be collected by an IVR that authenticates a caller, such as caller 120 or caller 125, through credentials that only the caller can provide. A voice reference model for each user can be created independently from individual voice prints. Thus, each user can complete the enrollment process independently. When voice reference models for both parties have been created, they are ready to be used in the verification phase when needed.

Consider, for example, the following. The users 120 and 125 open a joint account that requires that certain transactions be performed with both parties present. During an enrollment phase of the IVR system 100, user1 120 calls into a dedicated IVR system to create a voice reference model for her voice.

She may, for example, use the account identifier to identify the joint account and perhaps social security number or answers to security questions to authenticate her identity as an authorized user before providing her voice print to the IVR system. The IVR system captures user1 120's voice print at feature extraction block 130 and creates a voice reference model of user1 120 from this first voice print at model building block 140; the IVR system may then store user1 120's voice reference model in storage element 145.

Similarly, the second user, user2 125 goes through the enrollment phase 110 of the IVR system. User2 speaks to provide the needed voice print to feature extraction block 130 and model building block 140 uses this to create his unique voice reference model from his voice print; User2's voice reference model is stored in storage element 150 as shown.

As indicated, the users can provide their respective voice prints by speaking a password, answer to a security question or as otherwise prompted by the IVR system. It is noted that there may be more than two users of a joint account and the number of users required to be present to verify a desired transaction can vary. For very sensitive transactions, an account with three users, for example, may require verification by the verification phase of the IVR system by all three of the users.

Once the enrollment phase is complete for the required number of users of an account, the IVR system can accept users' request for any special transactions.

The IVR system can thus receive a request to conduct a transaction of the joint account that requires presence of the required number of users after enrollment has taken place. The users can call into the IVR system on the phone or via a conference call to the IVR system. The request to conduct a transaction of the joint account is initiated by the required number of users calling to the IVR system and referencing the joint account. The calls received by the IVR system from the users overlap in time and each user identifies the joint account.

During a defined period of time, the IVR system requests that each user provide a password or other security phrase by prompting each user at the same time with a prompt indicator. The prompt indicator may be a beep, for example, such as the IVR system prompting each user to speak their own password after the beep. The defined period of time is long enough for users to speak their password or other security information as needed for verification; for example, six to nine seconds may be the length of time of the defined period.

A mixed voice print is captured from this near-in-time or overlapping speaking by the users of their respective passwords during the defined period of time. Since for humans it is very difficult to have two or more persons speak at exactly the same time, one of the users will speak first during the defined period of time, while another will speak second. This joint speech 165 is received by the IVR system by feature extraction block 170.

Using the voice reference models created during the enrollment phase 110, it can be determined who speaks first and when the other user joined in during the defined period of time. Thus, at Block 170 the IVR system determines which of the first and second users spoke first at a first time stamp during the mixed voice print and when the other user of the first and second users spoke second at a second time stamp during the mixed voice print. The previously recorded and stored voice reference models created during the enrollment phase and stored in storage elements 145 and 150, for example, are used to determine this. It is noted that the feature extraction blocks 130 and 170 may or may not be the same actual block in the system. In other words, feature extraction block 130, which captures enrollment speech from the users may be the same, or different, from the feature extraction block 170 that captures the mixed voice print 165 from the users.

At Block 175, the IVR system creates a joined voice reference model of the first and second users from the first and second voice reference models created during the enrollment phase. A first time stamp of the joined voice reference model coincides with the first time stamp of the mixed voice print, i.e. when the first user spoke his password, while the second time stamp of the joined voice reference model corresponds with the second time stamp of the mixed voice print, i.e. when the second user joined in. It is noted that the joined voice reference model is a dynamic model specific to the first and second time stamps of the spoken first and second passwords supplied by the first and second users, respectively, during the defined period of time of the mixed voice print. In other words, the model is dynamic in that it is different each time the users of particular account call in jointly for verification of a desired transaction, given that humans will not have exact timing during each call.

At Block 180, the IVR system compares the mixed voice print to the newly created joined voice reference model. If the IVR system determines that these two match, as indicated at Block 190, the callers identifies are verified and the users are confirmed to be present. The IVR system will thus permit the transaction to proceed when the mixed voice print matches the joined voice reference model.

Figure 2:
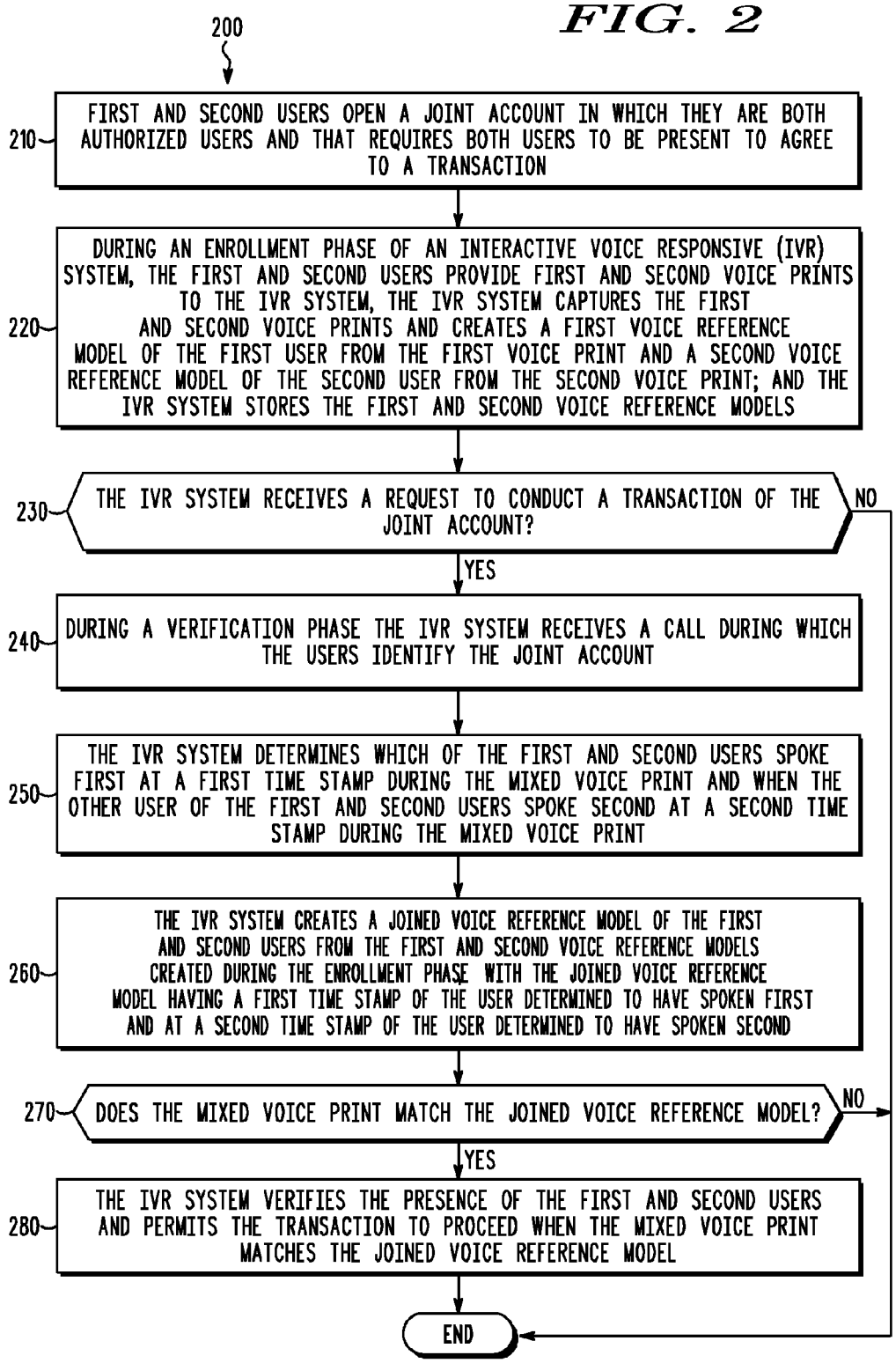
FIG. 2 is a flow diagram that illustrates verification of user presence during an IVR system session, in accordance with certain embodiments.

In accordance with various embodiments, a method of verification of user presence during an IVR system session is provided. Referring now to flow chart 200 of FIG. 2, at Block 210, users open a joint account in which they are both authorized users and that requires both users to be present to agree to a transaction. At Block 220, during an enrollment phase of an interactive voice response (IVR) system, the first and second users provide first and second voice prints of the first user to the IVR system, the IVR system captures the first voice print and second voice prints and creates a first voice reference model of the first user from the first voice print and a second voice reference model of the second user from the second voice print; and the IVR system stores the first and second voice reference models.

At Decision Block 230, the inquiry is whether the IVR system has received a request to conduct a transaction of the joint account. If no, then the flow ends. If yes, then the flow continues. At Block 240, during a verification phase the IVR system receives a call, such as a first call from the first user during which the first user identifies the joint account, a second call from the second user during which the second user identifies the joint account, or a conference call during which both callers participate. The IVR system determines which of the first and second users spoke first at a first time stamp during the mixed voice print and when the other user of the first and second users spoke second at a second time stamp during the mixed voice print at Block 250. At Block 260, the IVR system creates a joined voice reference model of the first and second users from the first and second voice reference models created during the enrollment phase, with the joined voice reference model having at a first time stamp the user determined to have spoken first and at a second time stamp the user determined to have spoken second.

At Decision Block 270, the inquiry is whether the mixed voice print matches the joined voice reference model. If yes, then at Block 280, the IVR system verifies the presence of the first and second users and permits the transaction to proceed when the mixed voice print matches the joined voice reference model.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of verification of user presence during an interactive voice response (IVR) system session, comprising:

during an enrollment phase of an interactive voice response (IVR) system:

a first user and a second user providing a first voice print of the first user and a second voice print of the second user to the IVR system, wherein the first user and a second user are authorized users of a joint account of the IVR system;

the IVR system capturing the first and second voice prints and creating a first voice reference model of the first user from the first voice print and a second voice reference model of the second user from the second voice print;

the IVR system storing the first and second voice reference models;

the IVR system receiving a request to conduct a transaction of the joint account that requires presence of both the first and second users during the transaction to complete the transaction;

in response to the IVR system receiving a request to conduct a transaction of the joint account, during a verification phase:

the IVR system requesting that the first user speak a first password of the first user during a defined period of time and that the second user speak a second password of the second user also during the defined period of time;

during the defined period of time, the IVR system receiving the first password from the first user and the second password from the second user and creating a mixed voice print of the first and second passwords received from the first and second user, respectively;

the IVR system determining which of the first and second users spoke first at a first time stamp during the mixed voice print and when the other user of the first and second users spoke second at a second time stamp during the mixed voice print;

the IVR system creating a joined voice reference model of the first and second users from the first and second voice reference models created during the enrollment phase, comprised at a first time stamp of the joined voice reference model the voice reference model of the user determined to have spoken first and at a second time stamp of the voice reference model of the user determined to have spoken second and wherein the first and second time stamps of the joined voice reference model correspond in time of the joined voice reference model to the first and second time stamps of the mixed voice print;

the IVR system comparing the mixed voice print to the joined voice reference model;

the IVR system verifying presence of the first and second users and permitting the transaction to proceed when the mixed voice print matches the joined voice reference model.

2. The method of claim 1, wherein the first user provides the first voice print by speaking the first password of the first user and wherein the second user provides the second voice print by speaking the second password of the second user.

3. The method of claim 1, wherein the request to conduct a transaction of the joint account is initiated by one or more of the first and second users calling to the IVR system and referencing the joint account.

4. The method of claim 1, wherein the first and second calls received by the IVR system overlap in time.

5. The method of claim 1, wherein the IVR system requests that the first user speak the first password and that the second user speak the second password of the second user during the defined period of time by prompting the first and second users with a prompt indicator.

6. The method of claim 5, wherein the prompt indicator is a beep.

7. The method of claim 1, wherein during the defined period of time, the first and second calls of the first and second users, respectively, initiate the verification phase by a conference call to the IVR system.

8. The method of claim 1, wherein the IVR system uses the first and second voice reference models created during the enrollment phase to determine which of the first and second users spoke first during the mixed voice print and when the other user of the first and second users spoke second during the mixed voice print.

9. The method of claim 1, wherein the joined voice reference model is a dynamic model specific to the first and second time stamps of the spoken first and second passwords supplied by the first and second users, respectively, during the defined period of time of the mixed voice print.

10. The method of claim 1, wherein during the enrollment phase the first and second users provide the first and second voice prints to the IVR system independently.

11. An interactive voice response (IVR) system, comprising:

a feature extraction element that receives a first voice print of a first user and a second voice print of a second user, wherein the feature extraction element receives the first and second voice prints during an enrollment phase of the IVR system, wherein the feature extraction element receives during a verification phase of the IVR system a call from the first and second users during which a joint account of the first and second users is identified and the first and second users request to conduct a transaction of the joint account that requires the presence of the first and second users to complete the transaction, and wherein during the verification phase the feature extraction element receives a first password from the first user during a defined period of time and a second password from the second user during the defined period of time;

a model building element that receives from the feature extraction element the first and second voice prints of the first and second users and creates first and second voice reference models of the first and second users, respectively;

a storage element that stores the first and second voice reference models;

a joint model building element that receives during the verification phase the first and second passwords from the first and second users, creates a mixed voice print, determines which of the first and second users spoke first at a first time stamp during the mixed voice print and when the other user of the first and second users spoke second at a second time stamp during the mixed voice print, and creates a joined voice reference model of the first and second users from the first and second voice reference models created during the enrollment phase, wherein at a first time stamp of the joined voice reference model has the voice reference model of the user determined to have spoken first and at a second time stamp of the voice reference model of the user determined to have spoken second and wherein the first and second time stamps of the joined voice reference model correspond in time of the joined voice reference model to the first and second time stamps of the mixed voice print;

a model comparison element that during the verification phase compares the mixed voice print with the joined voice reference model, wherein when the mixed voice print matches the joined voice reference model, the IVR system verifies the presence of the first and second users and permits the transaction to proceed.

12. The system of claim 11, wherein the first and second users are authorized users of a joint account of the IVR system.

13. The system of claim 11, wherein the first user provides the first voice print by speaking the first password of the first user and wherein the second user provides the second voice print by speaking the second password of the second user.

14. The system of claim 11, wherein the first and second users request to conduct a transaction of the joint account that requires the presence of the first and second users to complete the transaction is initiated by one or more of the first and second users calling to the IVR system and referencing the joint account during the verification phase.

15. The system of claim 14, wherein the feature extraction element requests that the first user speak the first password and that the second user speak the second password of the second user during the defined period of time by prompting the first and second users with a prompt indicator.

16. The system of claim 15, wherein the prompt indicator is a beep.

17. The system of claim 11, wherein the joined voice reference model is a dynamic model specific to the first and second time stamps of the spoken first and second passwords supplied by the first and second users, respectively, during the defined period of time of the mixed voice print.

* * * * *